United States Patent [19]

Der-Ming

[11] Patent Number: 4,825,699
[45] Date of Patent: May 2, 1989

[54] NON-DEFLECTABLE ADJUSTABLE BOURDON GAUGE

[75] Inventor: Juang Der-Ming, Taipei, Taiwan

[73] Assignee: Roc Triad International Co., Ltd., Taipei, Taiwan

[21] Appl. No.: 189,848

[22] Filed: May 3, 1988

[51] Int. Cl.$^4$ .................. G01L 7/04; G01L 19/02
[52] U.S. Cl. .................................. 73/740; 73/711; 74/522
[58] Field of Search ............... 73/740, 741, 711, 756; 74/522

[56] References Cited

U.S. PATENT DOCUMENTS

| | | | |
|---|---|---|---|
| 1,525,128 | 2/1925 | Heise | 73/740 |
| 2,406,098 | 8/1946 | Musgrave et al. | 73/740 |
| 2,737,811 | 3/1956 | Modes | 73/711 |
| 2,908,184 | 10/1959 | Matchett | 73/740 |

Primary Examiner—Donald O. Woodiel

[57] ABSTRACT

A bourdon gauge having a connection piece at the end of a bourdon tube for pivotably urging a link which in turn is connected to the arced arm of a sector plate. One end of an adjustment plate is frictionally secured and urged by an adjustment screw near the elbow of an arced arm which is on one end of the sector plate. The other end of the adjustment plate has a slot for slidably urging a rivet to move therein and simultaneously allowing the adjustment plate to turn so as to rotate the sector plate, hence allowing for adjustment of a pointer axle and needle of the bourdon gauge.

1 Claim, 7 Drawing Sheets

NON-DEFLECTABLE ADJUSTABLE BOURDON GAUGE

BACKGROUND OF THE INVENTION

This invention relates to bourdon gauges, and in particular relates to a bourdon gauge which can be manually adjusted without affecting the accuracy of the gauge.

Currently, at least two different types of bourdon gauges are on the market, but both have problems concerning the adjustability thereof. A first type of conventional bourdon gauge, as seen in FIG. 4-A and 4-B, provides no convenient method of manual adjustment or zeroing the gauge for the user. Therefore, if a gauge somehow was out of alignment or not properly zeroed, there was no choice but to replace the gauge or send it back to the manufacturer for repair. A second type of bourdon gauge, which is commonly seen in the United States, is adjustable, but due to the structure of the adjustment mechanism, the needle's or (pointer's) axle was inherently deflected if the needle were adjusted. This type of Bourdon gauge can be seen in FIG. 5-A, 5-B, and 5-C. Note that the center of the gauge is not fixed and thereby would be subject to movement with respect to the face of the gauge. Obviously, this would cause inaccuracies in the reading of the gauge.

It is the purpose of this present invention, therefore, to mitigate and/or obviate the above-mentioned drawbacks in the manner set forth in the detailed description of the preferred embodiment.

SUMMARY OF THE INVENTION

A primary objective of this invention is to provide a manually adjustable bourdon gauge which has a non-translating adjustable needle.

Another objective of this invention is to provide a bourdon gauge which has a fixed, centered needle which is adjustable by the manufacturer for several different pressure ranges.

Further objectives and advantages of the present invention will become apparent as the following description proceeds, the features of novelty which characterize the invention are pointed out with particularity in the claims annexed to and forming a part of this invention.

BRIEF DESCRIPTION OF THE DRAWINGS

FIG. 5-B and 5-C are top views of the prior art bourdon tube of FIG. 5-A; and

DETAILED DESCRIPTION OF THE PREFERRED EMBODIMENT

Figure 1:
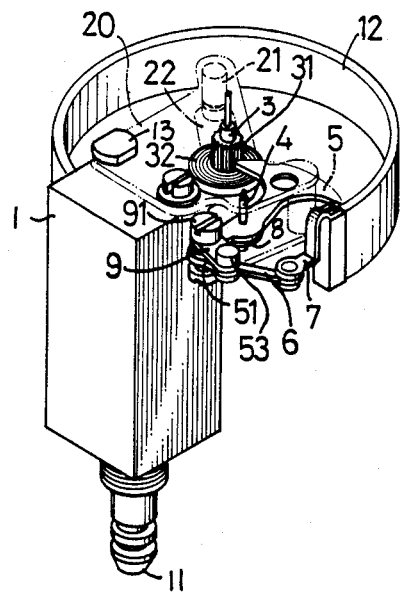
FIG. 1 is a perspective view of a bourdon tube in accordance with the present invention.
Figure 2:
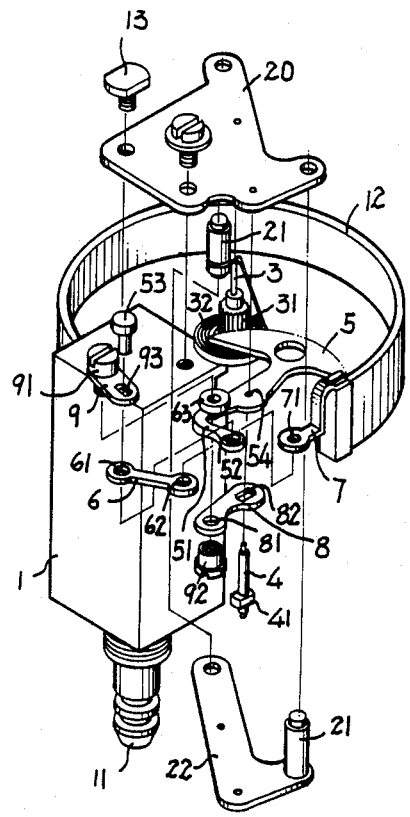
FIG. 2 is an exploded view of a bourdon tube in accordance with the present invention.

Referring to FIG. 1 and 2, it can be seen that a bourdon gauge in accordance with the present invention comprises the basic components of a bourdon tube 12, a gas block 1 with a gas inlet 11 protruding from the lower end thereof, upper and lower stabilizing plates 20 and 22, stabilizing posts 21, a pointer axle 3, a torsional spring 32, a sector plate axle 4, a sector plate 5 with an arced arm 5 on one end thereof, an adjustment plate 9 and an associated pair of adjustment screws 91.

The basic operation of the present bourdon gauge is similar to a conventional bourdon gauge, with one notable exception; i.e., the present bourdon gauge is manually adjustable without deflecting the pointer and the pointer axle 3. As with a conventional bourdon gauge, the bourdon tube 12 extends from a gas block 1 and communicates therewith so that as the gas pressure increases, the bourdon tube 12 straightens out and through a series of mechanical devices deflects the pointer axle 3 and the pointer (not shown). A connection piece 7 with a hole 71 thereon is fixed at the end of the bourdon tube 12. A rivet 53 rotatably connects a link 6 at hole 71, and the link 6, in turn, connects with an adjustment plate 9 at adjustment slot 93 and with an arced arm 51 of the sector plate 5, at hole 52. The sector plate 5 is pivotable about the top end of a sector plate axle 4 so that when the bourdon tube 12 straightens out the sector plate is indirectly urged to rotate counterclockwise (CCW).

Now looking at the pointer axle 3, it can be seen that the pointer axle 3 has a gear 31 thereon which is urgeable by the sector plate 5, so that when the sector plate moves CCW, the pointer axle 3 moves CW.

Figure 3:
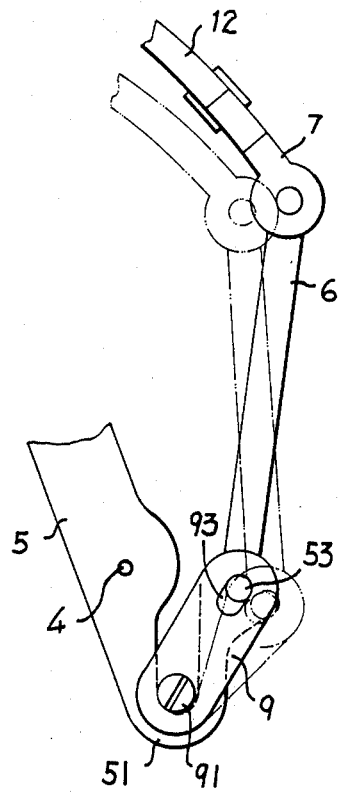
FIG. 3 is a close-up cutaway view of an adjustment plate and corresponding mechanism in accordance with the present invention.
Figure 4A:
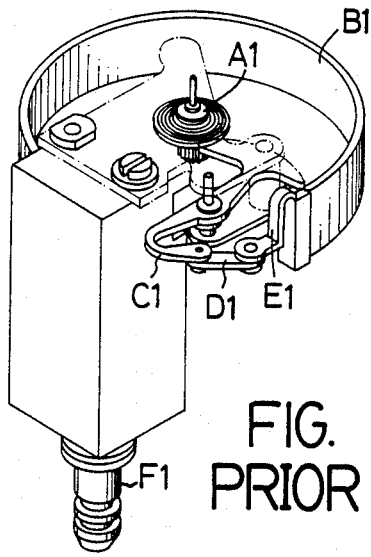
FIG. 4-A and 4-B are prior art perspective views of a non-adjustable bourdon tube.
Figure 4B:
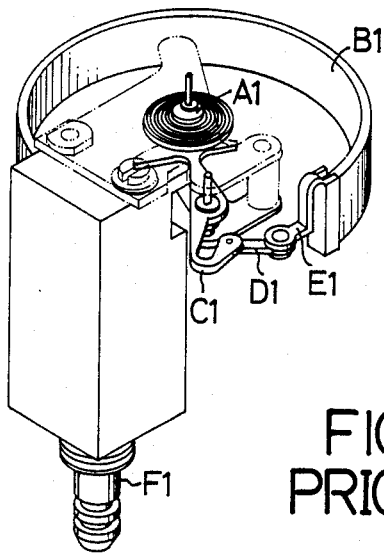
Figure 5A:
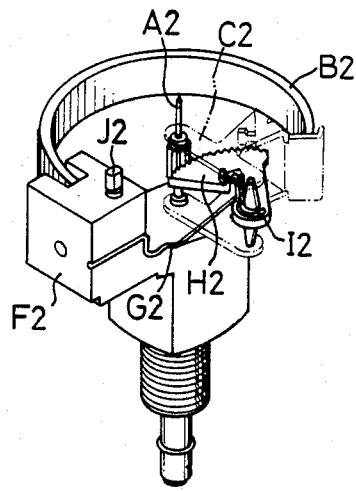
FIG. 5-A is a prior art perspective view of an adjustable (but translatable) bourdon tube.
Figure 5C:
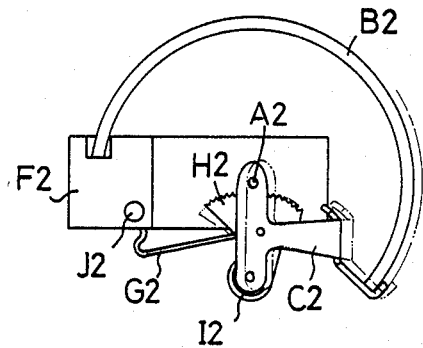
Figure 5B:
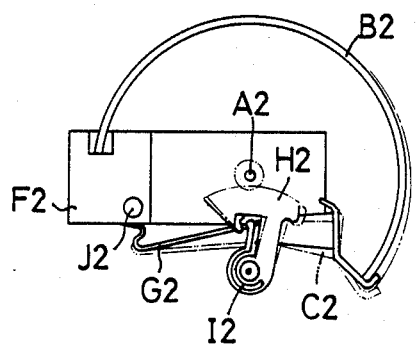

Further referring to FIG. 3, it can be understood that if the adjustment screw of the present invention 91 is urged CW, that the bourdon tube 12 will be pulled downwardly, as indicated by phantom (hidden) lines. Therefore, if the bourdon tube is not properly zeroed at atmospheric pressure, then the adjustment screw 91 can be turned CW or CCW in order to properly zero the pointer. If the adjustment screw 91 is turned CW, then the sector plate 5 is urged CW and the pointer axle 3 and needle (not shown) are urged CCW. Likewise, if the adjustment screw 91 is turned CCW, then the pointer axle 3 and needle are turned CW. So it can be understood that the present invention provides for manual adjustment without any translation of the needle, but only rotational movement.

Another feature of the present invention is that the length of the sector arm is adjustable, it can be used by the manufacturer for a variable range of pressures. For instance, if the normal pressure range is 20-80 kpa, then if a higher ranged pressure gauge were necessary, the adjustment screw 91 could be turned CW so as to adjust simultaneously the expansion angle of the bourdon tube to fit in the new applicable range of the gauge which would then be from 0-140 kpa. Of course, other ranges would be possible; for instance, 0-120 kpa, as determined by the manufacturer. It should be noted however, that while the same bourdon gauge could be used for a number of different pressure ranges, that the face of the bourdon gauge would still have to be manufactured separately so as to clearly indicate the pressure range where the gauge is not accurate. For example, if the bourdon gauge is used for a high pressure range such as from 0-140 kpa, the face of the bourdon gauge is also from zero to 140 kpa, however, the portion of the gauge from zero to 80 kpa is inaccurate and occupies a relatively small part of the face.

Figure 6A:
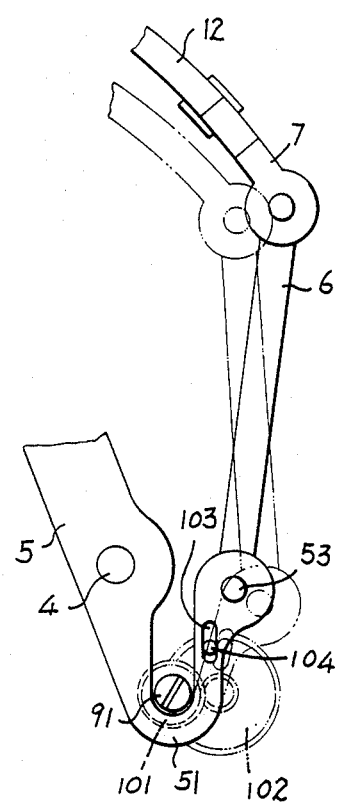
FIG. 6-A and 6-B are various alternate embodiments of an adjustment and corresponding mechanisms in accordance with the present invention.
Figure 6B:
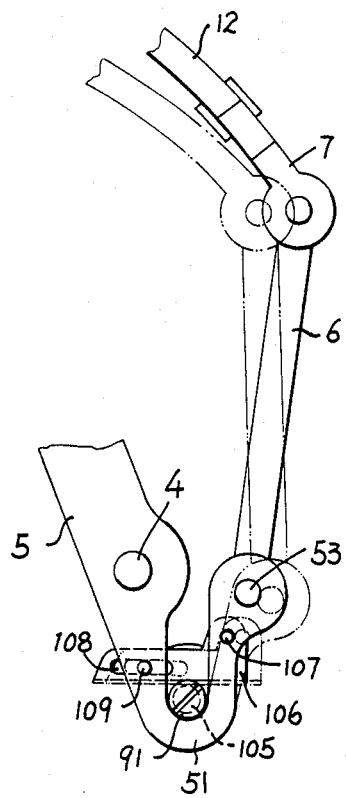

FIG. 6-A and 6-B show sample alternate embodiments which could be used in lieu of the preferred embodiment. FIG. 6-A uses a first and a second gear 101 and 102 to deflect the sector plate 5 (and hence the pointer axle 3). Note that a pi 104 is fixed slidably fixed in the slot 103 of the second gear 102 for slidably urging the arced arm 51 and the sector plate 5 to move. FIG. 6-8 shows a rack and pinion type system which accomplishes the same goal as the other two embodiments presented herein. The pinion-like screw 105 urges the rack plate 106 to translate, thereby urging a pin 109 and a pivot 107 to deflect the sector plate 5.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. In a bourdon gauge comprising a gas block (1) which communicates with a bourdon tube (12), a distal end of said bourdon tube (12) having a connection piece (7) fixed thereto which pivotably connects to a link (6), said link (6) pivotably connecting to an arced arm (51) of a sector plate (5), said sector plate being notched at one end thereof for urging a pointer axle (3) to rotate, the improvement comprising the combination of:

an adjustment plate (9), a first end of said adjustment plate (9) being rotatably fixed by a rivet (53) at a distal end of said arced arm (51), a second end of said adjustment plate (9) being threadably and frictionally secured to said sector plate (5) near an elbow portion of said arced arm (51) by a pair of adjustment screws (91) so that said sector plate (5) urges said pointer axle (3) to rotate counterclockwise when said pair of adjustment screws (91) is turned clockwise and vice-versa; and said pointer axle (3) being rotatably secured between an upper and a lower stabilizing plate (20 and 22), said lower stabilizing plate (22) being fixed to said upper stabilizing plate (20) by a plurality of stabilizing posts (21).

* * * * *